United States Patent [19]

Hartley

[11] Patent Number: 5,030,120
[45] Date of Patent: Jul. 9, 1991

[54] DUST COVER AND LOCKING ASSEMBLY FOR ELECTRICAL OR FIBER OPTIC CONNECTOR

[75] Inventor: James T. Hartley, Tustin, Calif.

[73] Assignee: Hughes Aircraft Company, Los Angeles, Calif.

[21] Appl. No.: 546,995

[22] Filed: Jul. 2, 1990

[51] Int. Cl.⁵ .............................................. H01R 13/44
[52] U.S. Cl. ..................................... 439/144; 439/372; 174/67
[58] Field of Search ............... 439/142, 143, 144, 145, 439/147, 149, 372, 536; 220/242; 174/66, 67; 350/96.2, 96.21, 96.22

[56] References Cited

U.S. PATENT DOCUMENTS

| 1,630,401 | 5/1927 | Meyer . | |
| 2,496,208 | 1/1950 | Hasselbaum . | |
| 3,239,791 | 3/1966 | Fyrk | 439/144 |
| 3,659,248 | 4/1972 | Mann . | |
| 3,716,815 | 2/1973 | Riches | 439/142 |
| 4,061,407 | 12/1977 | Snow | 439/144 X |
| 4,109,095 | 8/1978 | Kling et al. | 174/67 |
| 4,154,495 | 5/1979 | Crewse . | |
| 4,312,553 | 1/1982 | Lyckesjo . | |
| 4,390,226 | 6/1983 | Hohn | 439/144 X |
| 4,712,861 | 12/1987 | Lukas et al. | 439/142 X |
| 4,779,950 | 10/1988 | Williams | 350/96.21 |
| 4,784,610 | 11/1988 | Stuart | 439/144 |
| 4,840,577 | 6/1989 | Prouty | 439/373 |

Primary Examiner—Neil Abrams
Assistant Examiner—Khiem Nguyen
Attorney, Agent, or Firm—Terje Gudmestad; Wanda K. Denson-Low

[57] ABSTRACT

A dust cover and locking assembly (10) is mounted ajdacent to a fixed electrical or fiber optic receptacle connector (18) without modification thereto. A spring loaded cover member (46) has a sealing surface (54) which is moved into engagement with an exposed end (28) of the fixed connector (18) when a mating plug connector (34) is disconnected therefrom. The sealing surface (54) sealingly engages with a side wall (38) of the mating connector (34) when it is connected to the fixed connector (18), thereby preventing contamination of the sealing surface (54) by air or dust. Frictional engagement, latching, or cam action between the cover member (46) and mating connector (34) prevents the latter from being unintentionally loosened from the fixed connector (18).

24 Claims, 4 Drawing Sheets

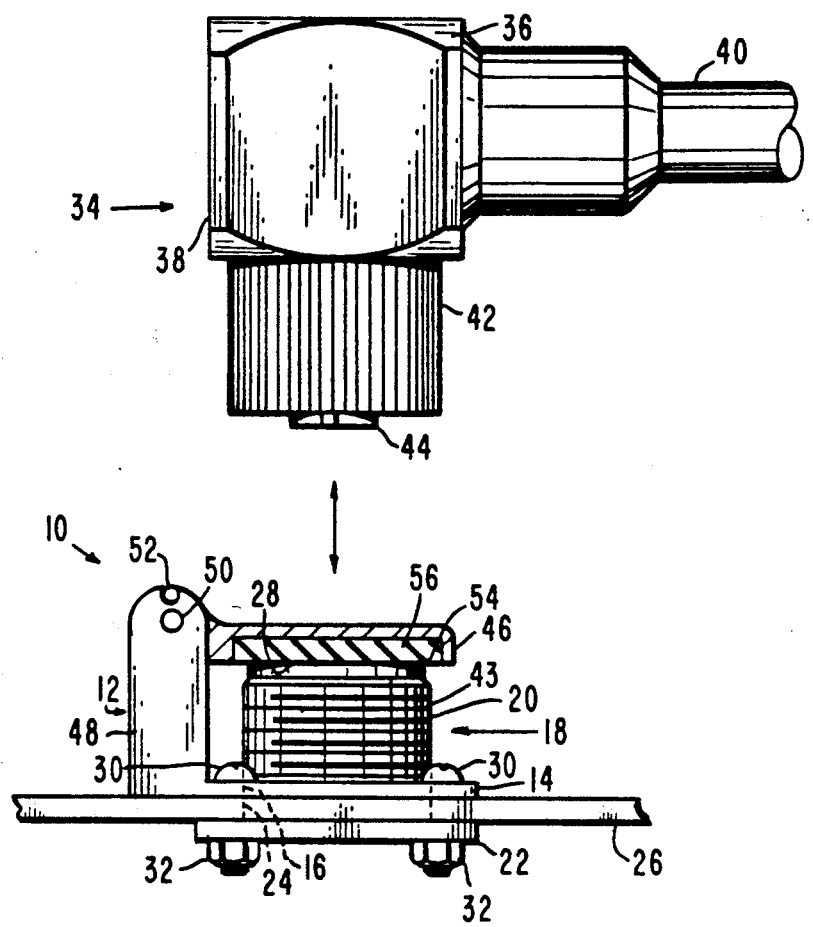
Fig. 1.
Fig. 2.
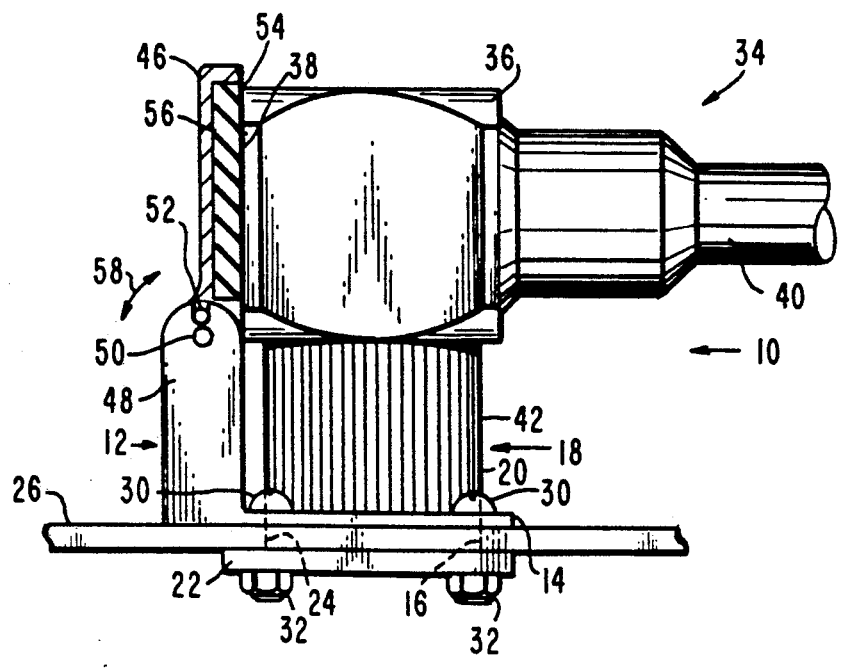

DUST COVER AND LOCKING ASSEMBLY FOR ELECTRICAL OR FIBER OPTIC CONNECTOR

BACKGROUND OF THE INVENTION

1. Field of the Invention

The present invention relates to a dust cover and locking assembly for an electrical or fiber optic connector.

2. Description of the Related Art

Dust covers are desirable for preventing contamination of the exposed ends of electrical, pneumatic, or fiber optic connectors when mating connectors are not connected thereto. Optical fibers are especially sensitive to contamination since they are typically smaller than 100 microns in diameter. A single particle of dirt or dust on the end of an optical fiber in a connector can seriously damage and/or completely block light transmission through the connector. The contacts of electrical connectors are sensitive to corrosion through exposure the atmosphere.

Conventional dust covers are connected to their respective connectors in the same manner as the mating connectors; i.e. threaded or bayonet connections, and are retained near the connectors by lanyards or chains.

The main problem with this arrangement is that the dust covers are a nuisance to attach to the connectors, and are often left unattached due to thoughtlessness or neglect. Also, conventional dust covers are subject to loosening caused by vibration, allowing air and other contaminants to enter the connector.

A number of dust covers which are movable into operative positions when a mating connector is disconnected from a fixed connector have been proposed in the prior art. A typical example is found in U.S. Pat. No. 3,659,248, entitled "COMBINED SOCKET COVER AND PLUG RETAINER", issued Apr. 25, 1972 to F. Mann et al. This patent discloses a plastic member provided with a hinge which is attached to a supporting wall next to an electrical socket. The plastic member is provided with a retaining flange spaced from the hinge. When the socket is empty, the member can be pivoted on its hinge down over the socket, and can be held by the retaining flange so as to serve as a cover for the socket. When a plug is to be inserted into the socket, the member can be pivoted on its hinge so that the retaining flange can engage the plug so as to serve as a plug retainer.

U.S. Pat. No. 4,312,553, entitled "ELECTRICAL CONNECTION DEVICE", issued Jan. 26, 1982 to R. Lyckesjo, improves on the Mann arrangement by spring loading a cover which corresponds to Mann's plastic member, and providing it with a seal so that it is automatically moved into sealing engagement with the socket when the plug is removed therefrom.

U.S. Pat. No. 4,779,950, entitled "CONNECTION APPARATUS FOR OPTICAL FIBERS", issued Oct. 25, 1988 to R. Williams, discloses an optical fiber connection apparatus including a pair of mating connector halves, each accommodating at least one optical fiber. A plug half is insertable into a receptacle half to provide optical connection between the fibers therein. The receptacle portion includes a movable cover supported thereon. The cover is movable from a first position covering the receptacle and thereby protecting the fiber therein to a second position opening the receptacle to allow for insertion of the plug. The cover is also movable to lock the plug into the receptacle.

Although Williams' movable cover protects the optical fiber when the plug is disconnected from the receptacle, there is a gap between the cover and a side wall of the receptacle when the plug and receptacle are connected, into which dirt and dust can enter. These contaminants may be transferred from the cover to the end face of the optical fiber when the plug is disconnected from the receptacle, with damaging results.

SUMMARY OF THE INVENTION

The present invention allows one assembly to serve two purposes. As a dust cover, it provides a "fail safe" mechanism which will always sealingly cover the interface of a receptacle connector even if a technician forgets or neglects to put the cover in place. This feature is especially important for fiber optic connectors which must maintain clean surfaces. As an anti-vibration locking mechanism, it also provides fail safe operation. When a threaded or any rotational coupling mechanism is mated to a receptacle with this type dust cover, the cover automatically acts as a locking or anti-rotation device which prevents vibrational unmating. Spring action forces the cover and locking assembly into its operative position, and a conscious effort is required to negate the spring action. To uncover the receptacle connector interface, a lever arm of the cover must be forced down by hand. This allows the plug connector to be connected to the receptacle. When a coupling nut, for example, of the plug connector is fully screwed onto the receptacle and the lever arm is released, the cover becomes a locking mechanism which resists further rotation of the coupling nut.

Neither the receptacle nor mating plug need any modifications to employ this design. Retrofitting of existing installations may be made without rewiring. The present assembly is mounted adjacent to the receptacle connector under its mounting jam nut, or by attachment under its mounting screw heads.

The surface of the dust cover which seals the end of the receptacle connector is itself protected from contamination when a plug connector is mated with the receptacle connector. This is accomplished by designing the dust cover so that its sealing surface engages with a side wall of the plug connector. Thus, the sealing surface of the cover is only exposed to a contaminating environment for brief periods of time during which the connectors are being connected or disconnected.

In accordance with the present invention, a dust cover and locking assembly is mounted adjacent to a fixed electrical or fiber optic connector without modification thereto. A spring loaded cover member has a sealing surface which is moved into engagement with an exposed end of the fixed connector when a mating connector is disconnected therefrom. The sealing surface sealingly engages with a side wall of the mating connector when it is connected to the fixed connector, thereby preventing contamination of the sealing surface by air or dust. Frictional engagement, latching, or cam action between the cover member and mating connector prevents the latter from being unintentionally detached from the fixed connector.

These and other features and advantages of the present invention will be apparent to those skilled in the art from the following detailed description, taken together with the accompanying drawings, in which like reference numerals refer to like parts.

DESCRIPTION OF THE DRAWINGS

FIG. 1 is a side elevation, partly in section, illustrating a dust cover and locking assembly for an electrical or fiber optic receptacle connector embodying the present invention in a closed position;

FIG. 2 is a side elevation, partly in section, illustrating the present assembly with a cover member thereof in a locking position in engagement with a side wall of a mating plug connector;

DETAILED DESCRIPTION OF THE INVENTION

Figure 3:
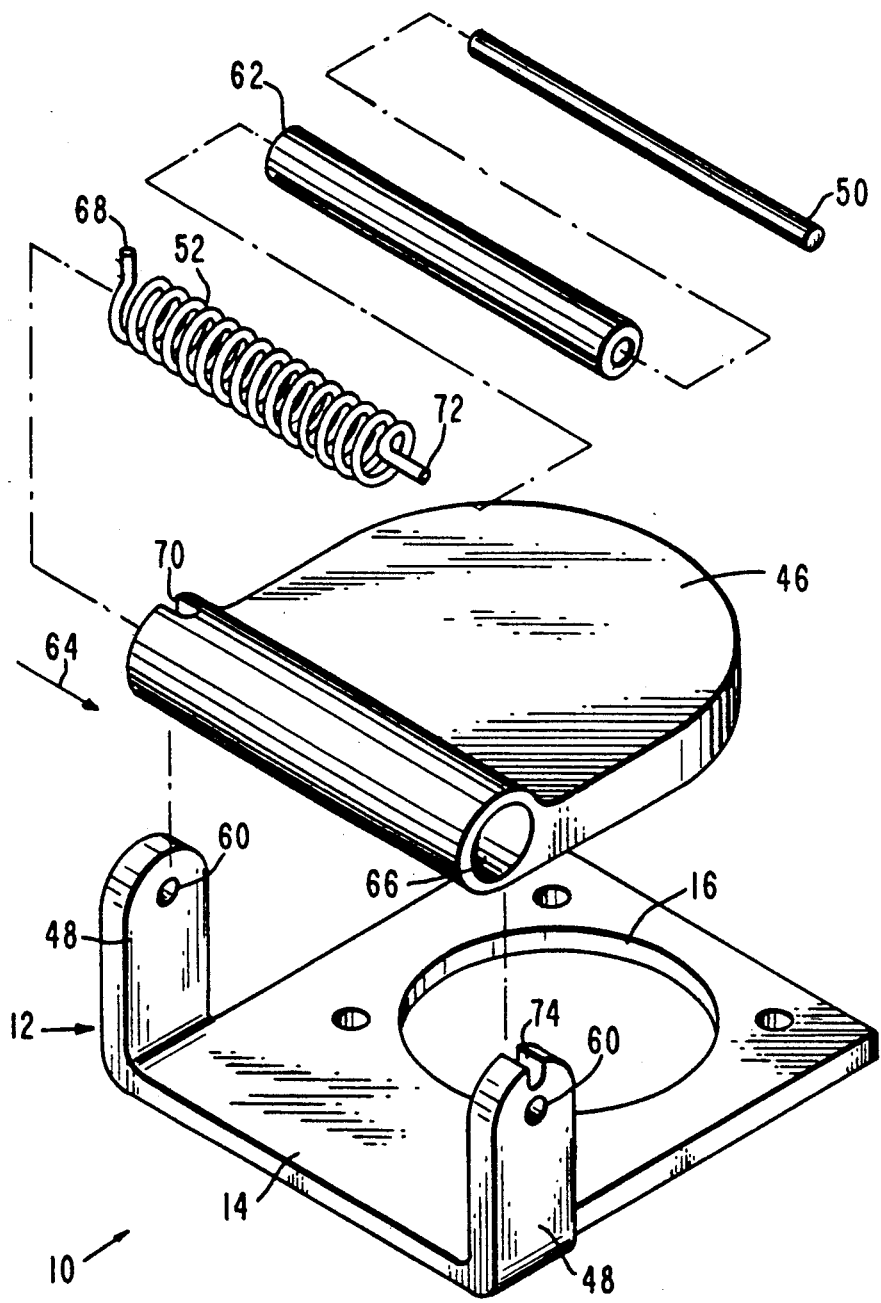
FIG. 3 is an exploded view of the assembly illustrated in FIGS. 1 and 2.

Referring now to FIGS. 1 to 3 of the drawing, a dust cover and locking assembly embodying the present invention is generally designated as 10, and includes a support bracket 12 having a flat base 14 formed with a hole 16 therethrough. A receptacle connector 18 includes a cylindrical body 20 which extends from a mounting flange 22 through a hole 24 in a bulkhead or panel wall 26 upwardly through the hole 16 in the support bracket 12. The receptacle connector 18 may be designed for connection of electric lines, pneumatic lines, optical fibers, or any other transmission line means in accordance with the present invention. The cylindrical body 20 has a connecting end 28.

The assembly 10 may be retrofittingly mounted adjacent to the receptacle connector 18 using the same screws 30 and nuts 32 which were used to originally mount the connector 18 on the wall 26. This is accomplished merely by removing the screws 30 and nuts 32, placing the assembly 10 in position over the body 20 of the connector 18, and refastening the screws 30 and nuts 32 through aligned holes (not designated) in the base 14, wall 26, and flange 22. No modification to the receptacle connector 18 is required.

The receptacle connector 18 is designed to mate with a conjugate plug receptacle 34, which is illustrated as having a right angle configuration. The plug connector 34 includes a body 36 having a flat side wall 38, and a cable 40 extending from the body 36 at a right angle. The plug connector 34 is designed to operatively mate with the connecting end 28 of the receptacle connector 18, and further includes a rotating coupling nut 42 which engages with threads 43 formed in the outer surface of the body 20 of the connector 18 to retainingly mate the connectors 18 and 34 with each other. Further illustrated is a master key 44 formed in the lower end of the body 36 which engages with a conjugate slot (not shown) in the connector 18 for preventing rotation of the connector 18 relative to the connector 34.

The present dust cover and locking assembly 10 further includes a cover member 46 which is hinged to the ends of arms 48 extending upwardly from the base 14 of the support bracket 12 for pivotal movement about a shaft or pin 50. The cover member 46 is biased by a torsion spring 52 toward a closed position as illustrated in FIG. 1 with a sealing surface 54 thereof in sealing engagement with the connecting end 28 of the receptacle connector 18. The sealing surface 54 is preferably provided by a resilient gasket or insert 56 made of rubber, plastic or the like fixed to the cover member 46, and automatically protects the connecting end 28 of the receptacle connector 18 from contamination by dirt, dust, fluids, etc. due to the action of the spring 52 when the plug connector 34 is disconnected from the connector 18 as illustrated in FIG. 1.

FIG. 2 illustrates the plug connector 34 operatively connected or mated to the receptacle connector 18. This is accomplished by rotating the cover member 46 in the direction of an arrow 58 against the force of the spring 52 to uncover the connecting end 28 of the receptacle connector 18, mating the body 36 of the plug connector 34 to the body 20 of the connector 18 with the master key 44 properly aligned, and screwing the coupling nut 42 onto the body 20.

In accordance with an important feature of the present invention, the sealing surface 54 of the cover member 46 is urged by the spring 52 into sealing engagement with the flat surface 38 of the body 36 of the plug receptacle 34. In this manner, the sealing surface 54 is protected from contamination when the plug connector 34 is connected to the receptacle connector 18 as illustrated in FIG. 2, as well as when the connector 34 is disconnected from the connector 18 as illustrated in FIG. 1. This positively prevents contamination of the connecting end 28 of the receptacle connector 18, which may enclose a small diameter optical fiber (not shown).

The detailed construction of the present dust cover and locking assembly 10 is illustrated in FIG. 3. The ends of the pin 50 fit in holes 60 formed through the upper ends of the arms 48. A bushing 62 fits over the pin 50, and the torsion spring 52 fits over the bushing 62. The pin 50, bushing 62, and spring 52 fit in a hole 66 formed through an edge portion of the cover member 46. The spring 52 has a radially extending end 68 which retainingly fits in a longitudinally elongated, radial slot 70 formed in the cover member 46. The spring 52 has a longitudinally extending opposite end 72 which fits in a slot 74 formed in the end of one of the arms 48.

The assembly 10 is assembled by sliding the spring 52 into the hole 66 in the cover member 46 in the direction of an arrow 64 until the end 68 fits in the slot 70. The bushing 62 is slid into the spring 52. The cover member 46 is positioned between the arms 48, and the end 72 of the spring 52 is rotated until it fits into the slot 74. The pin 50 is then inserted into the bushing 62 and holes 60 to retain the cover member 46 on the mounting bracket 12 with the cover member 46 biased by the spring 52 toward the hole 16.

Figure 4:
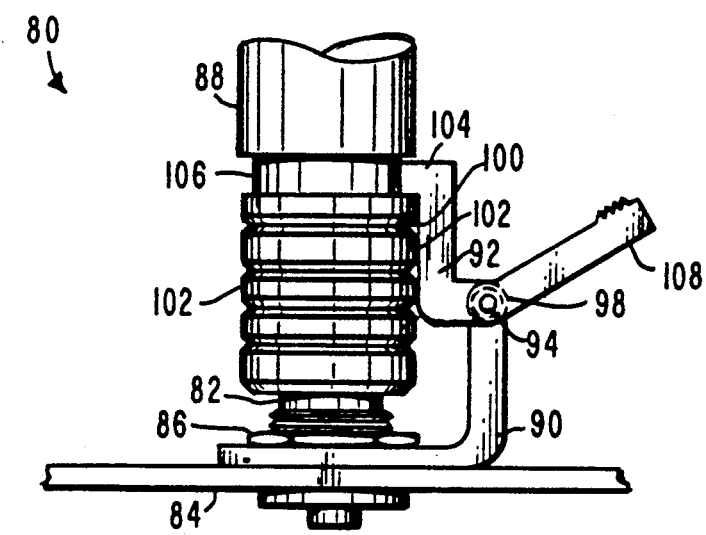
FIG. 4 is a side elevation illustrating a modified embodiment of the assembly of FIGS. 1 to 3.

In the embodiment of FIGS. 1 to 3, the plug connector 34 is prevented from being longitudinally detached from the receptacle connector 18 by frictional engagement between the sealing surface 54 of the cover member 46 and the coupling nut 42 of the plug connector 34. This prevents the nut 42 from rotating, and thereby allowing the connector 34 to move longitudinally. FIG. 4 illustrates another dust cover and locking assembly 80 embodying the present invention. In this case, a receptacle connector 82 is mounted on a bulkhead or panel wall 84 by means of a jam nut 86. A conjugate plug connector 88 is designed to mate with the receptacle connector 82 by means of a push-pull arrangement (not shown), which prevents rotation of the connector 88 relative to the connector 82. The present assembly 80 includes a mounting bracket 90 which is retained on the panel wall 84 by the jam nut 86 together with the connector 82. A cover member 92 is pivotally supported by the bracket 90 about a pin 94, and urged counterclockwise as viewed in the drawing by a torsion spring 98. The cover member 92 has a sealing surface 100 which sealingly engages with a connecting end (not shown) of the receptacle connector 82, and with a side wall 102 of the plug connector 88 in the manner described above with reference to FIGS. 1 to 3. In addition, the cover member 92 is formed with a latch portion 104 which engages in a slot 106 formed in the side wall 102 of the connector 88 when the connectors 82 and 88 are mated or connected together as viewed in FIG. 4. The latch portion 104 prevents the connector 88 from being longitudinally disconnected from the connector 82.

The cover member 92 may be further formed with a lever arm 108 to facilitate actuation thereof. To mate the plug connector 88 with the receptacle connector 82, the cover member 92 is rotated clockwise by depressing the lever arm 108 to uncover the connecting end of the connector 82. The connector 88 is slid downwardly into mating engagement with the connector 82, and the lever arm 108 released, thereby allowing the cover member 92 to be moved into engagement with the side wall 102 of the plug connector 88 by the spring 98. The sealing surface 100 of the cover member 92 is moved into protective sealing engagement with the side wall 102, whereas the latch portion 104 engages in the groove 106 to retain the connectors 82 and 88 in operative engagement. It will be understood that the assembly 10 illustrated in FIGS. 1 to 3 may be similarly provided with a lever arm, if desired, within the scope of the invention.

Figure 5:
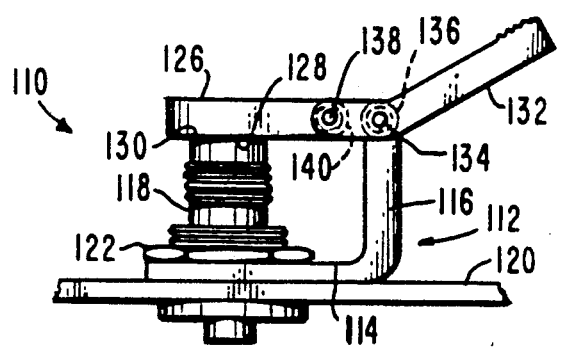
FIGS. 5, 6 and 7 are simplified side elevations illustrating another dust cover and locking assembly embodying the present invention in closed, intermediate, and open positions respectively.

Another dust cover and locking assembly 110 embodying the present invention is illustrated in FIGS. 5 to 8. A support bracket 112 includes a flat base 114 and an arm 116 which extends upwardly from the base 114. A receptacle connector 118 is mounted integrally with the assembly 110 on a wall 120 by means of a jam nut 122. The assembly 110 further includes a cover member 126 having a sealing surface 128 designed to sealingly engage with a connecting end 130 of the receptacle connector 118 when no plug connector is mated therewith as illustrated in FIG. 5.

Figure 7:
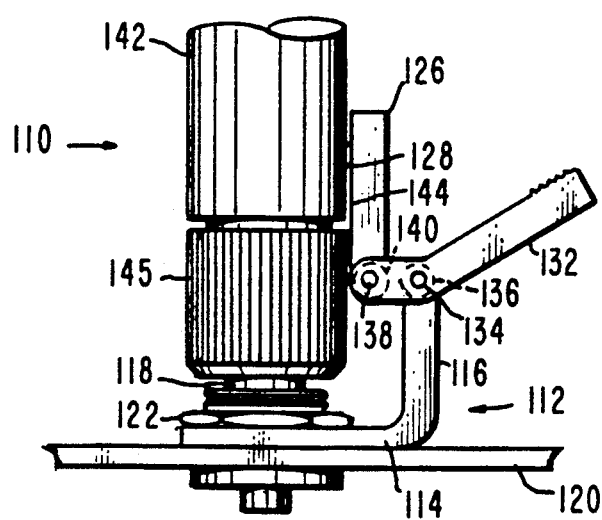
Figure 8:
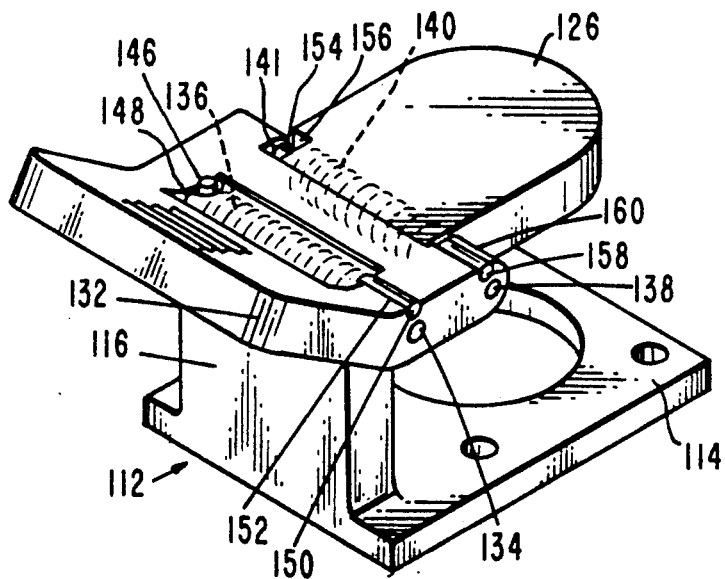
FIG. 8 is a perspective view of the assembly illustrated in FIGS. 5, 6 and 7.

As shown in detail in FIG. 8, a lever arm 132 is hinged to the upper end of the arm 116 about a pin 134, and biased counterclockwise as viewed in FIG. 5 by a relatively weak torsion spring 136. The cover member 126 is hinged to a bifurcated end of the lever arm 132 about a pin 138, and biased counterclockwise by a relatively strong torsion spring 140. The springs 136 and 140 are illustrated symbolically in FIGS. 5 to 7.

Figure 6:
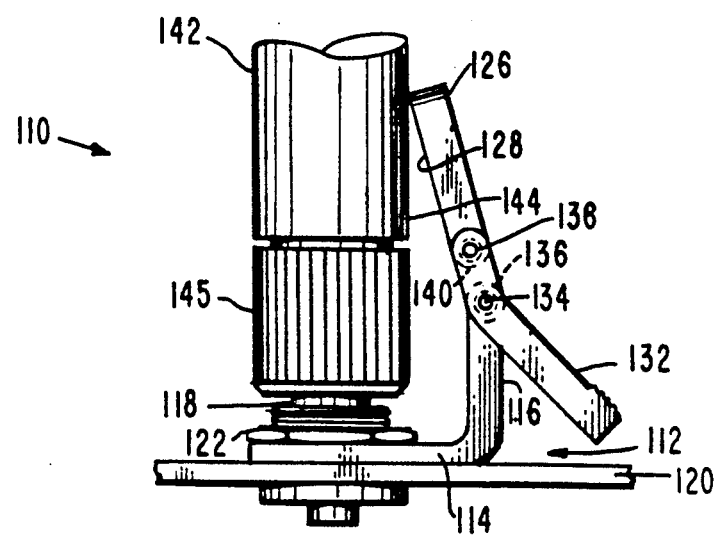

In the position of FIGS. 5 and 8, the cover member 126 is urged into abutment with a stop pin 141 extending inwardly from one of the bifurcations of the end of the arm 132 by the strong spring 140, so that the lever arm 132 and cover member 126 pivot as a unit about the pin 134. In order to mate a conjugate plug connector 142 with the receptacle connector 118, the lever arm 132 is depressed or rotated clockwise as viewed in FIGS. 5 to 7 until the cover member 126 is clear of the receptacle connector 118, the connector 142 is mated with the connector 118, and the lever arm 132 released. The result of these actions is illustrated in FIG. 6, in which the cover member 126 is rotated counterclockwise into abutment with a side wall 144 of the plug connector 142 by the weak spring 136.

The connection is completed as illustrated in FIG. 7 by lifting or rotating the lever arm 132 counterclockwise. This overcomes the force of the strong spring 140 and enables the cover member 126 to rotate clockwise about the pin 138 so that the sealing surface 128 sealingly engages with a coupling nut 145 and a portion of the side wall 144 of the plug connector 142. In addition to this action, the spacing between the pins 134 and 138, as well as the other relevant dimensions of the assembly 110, are selected such that the lower end portion of the cover member 126 engages tightly with the side wall 144 of the connector 142 as viewed in FIG. 7 due to a cam action in combination with the lever arm 132. This tight engagement resists disconnection of the plug connector 142 from the receptacle connector 18 in both rotation and translation.

As viewed in FIG. 8, the spring 136 has a radially extending end 146 which fits in a slot 148 formed in the upper end of the arm 116, and a longitudinally extending end 150 which fits into a slot 152 formed in the lever arm 132. The spring 140 has a radially extending end 154 which fits in a slot 156 formed in the cover member 126, and a longitudinally extending end 158 which fits in a slot 160 formed in the lever arm 132.

Figure 9:
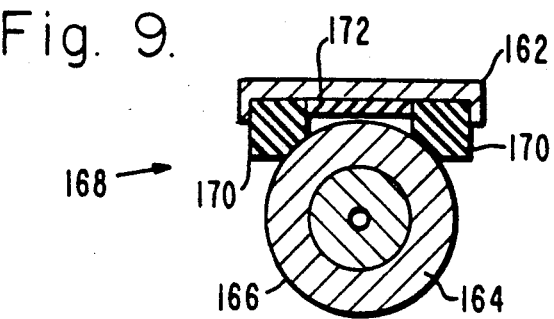
FIG. 9 is a top sectional view illustrating an alternative sealing arrangement for the present assembly.

The present dust cover and locking assembly is adaptable to a plug receptacle which has a flat side wall as illustrated in FIGS. 1 and 2, or a cylindrical side wall as illustrated in FIGS. 4 to 8. In the latter case, the sealing surface may be sufficiently resilient to conform to the cylindrical side wall of the plug connector when the same is mated with the receptacle connector, and to conform to the flat connecting end of the receptacle connector when the plug connector is disconnected therefrom. Alternatively, the sealing surface of the cover member may be provided by a gasket or insert having several sections. FIG. 9 illustrates a cover member 162 and a plug connector 164 having a cylindrical side wall 166. A gasket or insert 168 is fixed to the cover member 162 by adhesive or the like, and includes an outer section 170 designed to sealingly conform to the cylindrical side wall 166. The section 170 may have a flat surface and be sufficiently resilient to deform into sealing engagement with the side wall 166, or may have a curved shape conjugate to the side wall 166. The insert 168 further includes a flat inner section 172 having a diameter selected to sealingly engage with the connecting end of the receptacle connector (not shown) when the plug connector 164 is disconnected therefrom. The sections 170 and 172 may be formed in two separate pieces, or may be integrally formed as a single piece.

While several illustrative embodiments of the invention have been shown and described, numerous variations and alternate embodiments will occur to those skilled in the art, without departing from the spirit and scope of the invention. Accordingly, it is intended that the present invention not be limited solely to the specifically described illustrative embodiments. Various modifications are contemplated and can be made without departing from the spirit and scope of the invention as defined by the appended claims.

I claim:

1. In a connector assembly including a first connector member having a connecting end; and a second connector member constructed to be conjugately connected to and disconnected from the connecting end of the first connecting member, the second connector member having a side wall; the improvement comprising:
- a cover member having a sealing surface, the sealing surface being designed to sealingly engage with the connecting end of the first connector and to sealingly engage with the first wall of the second connector; and
- biasing means for urging the cover member toward a first position in which the sealing surface sealingly engages with the connecting end of the first connector member when the second connector member is disconnected from the first connector member; and for urging the cover member toward a second position in which the sealing surface sealingly engages with the side wall of the second connector member when the second connector member is connected to the first member.

2. An assembly as in claim 1, in which the cover member and biasing means are constructed to resist disconnection of the second connector member from the first connector member when the cover member is in the second position.

3. An assembly as in claim 2, in which the cover member and biasing means are constructed such that the sealing surface of the cover member frictionally engages with the side wall of the second connector member.

4. An assembly as in claim 3, in which the connecting end of the first connector member has a flat surface, and the side wall of the second connector member has a curved surface, the sealing surface of the cover member being constructed to sealingly conform to both said flat surface and said curved surface.

5. An assembly as in claim 4, in which the sealing surface of the cover member includes a curved outer portion which sealingly engages with said curved surface, and a flat inner portion which sealingly engages with said flat surface.

6. An assembly as in claim 2, in which the cover member comprises a latch portion which retainingly engages the second connector member.

7. An assembly as in claim 1, in which the first connector member is fixedly mounted, the assembly further comprising mounting means for fixedly mounting the cover member and biasing means adjacent to the first connector member.

8. An assembly as in claim 1, further comprising hinge means for pivotally supporting the cover member, the biasing means rotatably urging the cover member about the hinge means toward the first position.

9. An assembly as in claim 1, further comprising an actuating lever for moving the cover member away from the first position.

10. An assembly as in claim 9, in which the actuating lever pivotally supports the cover member, and causes the cover member to be cammed into retaining engagement with the second connector member When the cover member is in the second position.

11. An assembly as in claim 10, in which the biasing means comprises:
- a first spring connected between the actuating lever and the cover member for urging the cover member toward the first position; and
- a second spring for urging the actuating lever and thereby the cover member toward the first position.

12. An assembly as in claim 11, in which the first spring is stronger than the second spring.

13. A dust cover and locking assembly for a receptacle connector having an exposed end, the receptacle connector being constructed to be conjugately connected to and disconnected from a plug connector, the plug connector having a side wall, comprising:
- a cover member having a sealing surface, the sealing surface being designed to sealingly engage with the exposed end of the receptacle connector and to sealingly engage with the first wall of the plug connector; and
- biasing means for urging the cover member such that the sealing surface sealingly engages with the exposed end of the receptacle connector when the plug connector is disconnected from the receptacle connector;
- the biasing means further urging the cover member such that the sealing surface sealingly engages with the side wall of the plug connector when the plug connector is connected to the receptacle connector.

14. An assembly as in claim 13, in which the cover member and biasing means are constructed to resist disconnection of the plug connector from the receptacle connector member when the plug connector is connected to the receptacle connector.

15. An assembly as in claim 14, in which the cover member and biasing means are constructed such that the sealing surface of the cover member frictionally engages with the side wall of the plug connector.

16. An assembly as in claim 15, in which the exposed end of the receptacle connector has a flat surface, and the side wall of the plug connector has a curved surface, the sealing surface of the cover member being constructed to sealingly conform to both said flat surface and said curved surface.

17. An assembly as in claim 16, in which the sealing surface of the cover member includes a curved outer portion which sealingly engages with said curved surface, and a flat inner portion which sealingly engages with said flat surface.

18. An assembly as in claim 14, in which the cover member comprises a latch portion which retainingly engages the plug connector.

19. An assembly as in claim 13, in which the receptacle connector is fixedly mounted, the assembly further comprising mounting means for fixedly mounting the cover member and biasing means adjacent to the receptacle connector.

20. An assembly as in claim 13, further comprising hinge means for pivotally supporting the cover member, the biasing means rotatably urging the cover member about the hinge means toward the receptacle connector.

21. An assembly as in claim 13, further comprising an actuating lever for moving the cover member away from the receptacle connector.

22. An assembly as in claim 21, in which the actuating lever pivotally supports the cover member, and causes the cover member to be cammed into retaining engagement with the plug connector when the cover member is engaged therewith.

23. An assembly as in claim 22, in which the biasing means comprises:
- a first spring connected between the actuating lever and the cover member for urging the cover member toward the receptacle connector; and
- a second spring for urging the actuating lever and thereby the cover member toward the receptacle connector.

24. An assembly as in claim 23, in which the first spring is stronger than the second spring.

* * * * *